July 11, 1939.  R. A. THOMPSON  2,165,588
BROACHING MACHINE
Filed Jan. 24, 1936    5 Sheets-Sheet 1
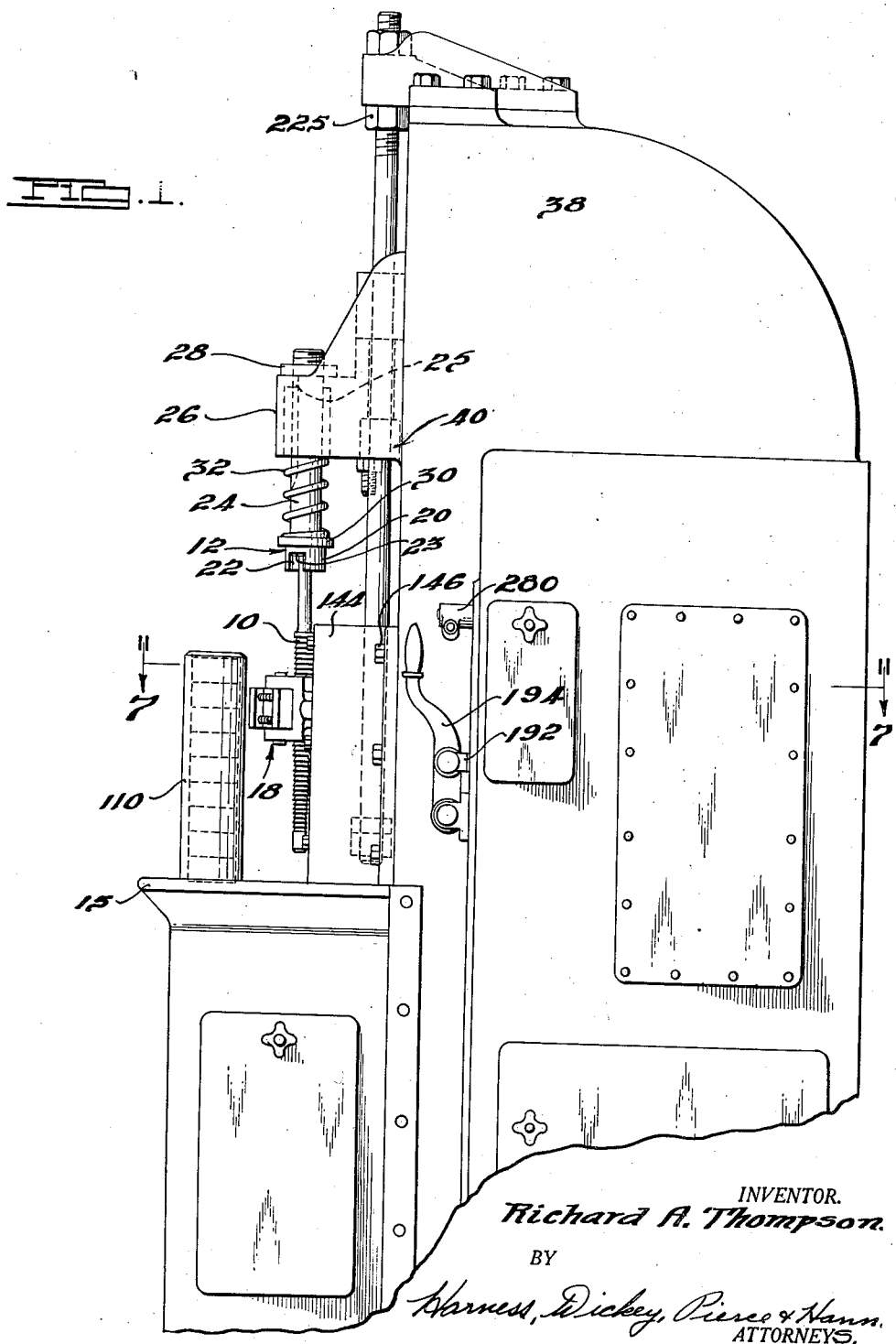
INVENTOR.
Richard A. Thompson.
BY
Harness, Dickey, Pierce & Hann,
ATTORNEYS.

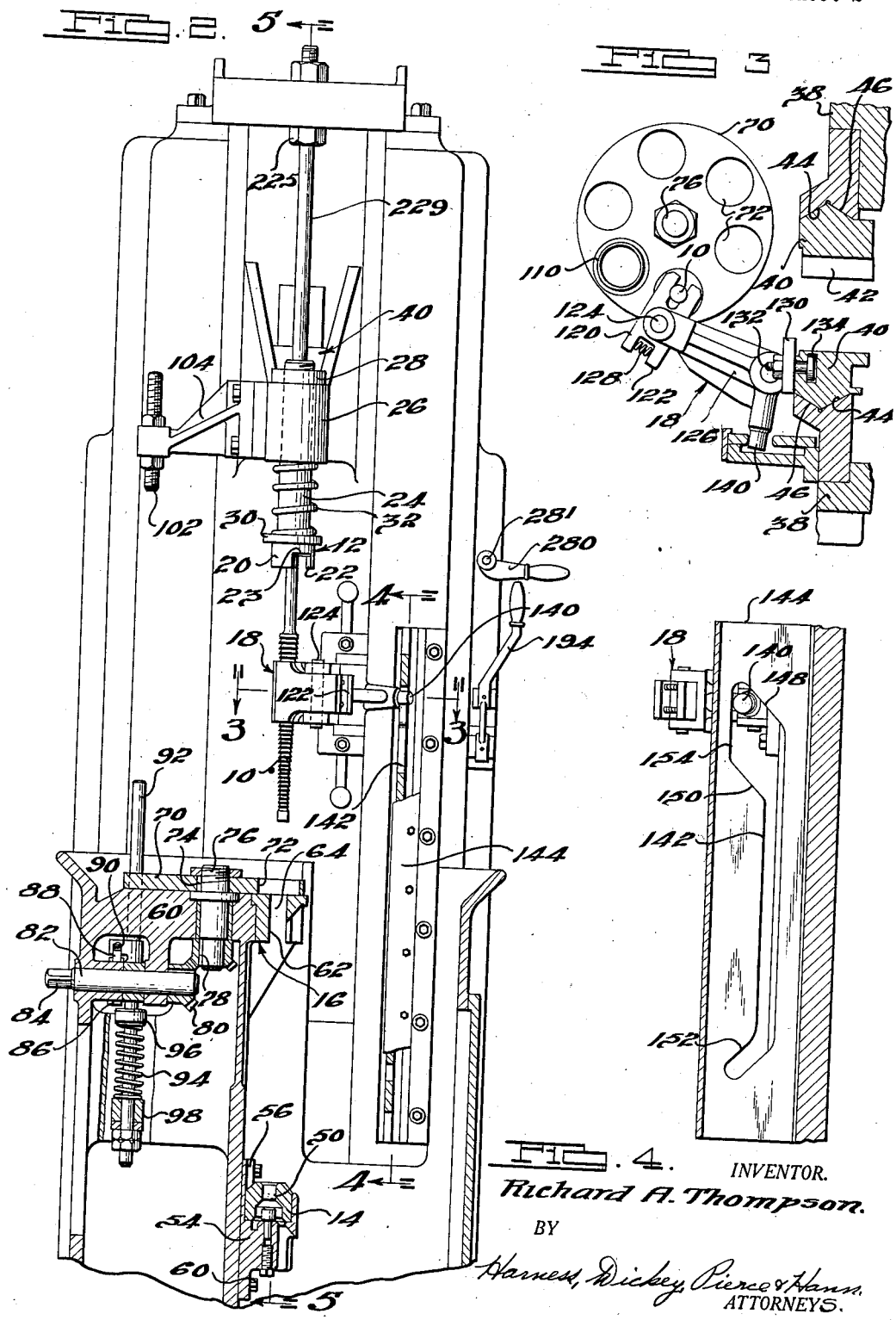

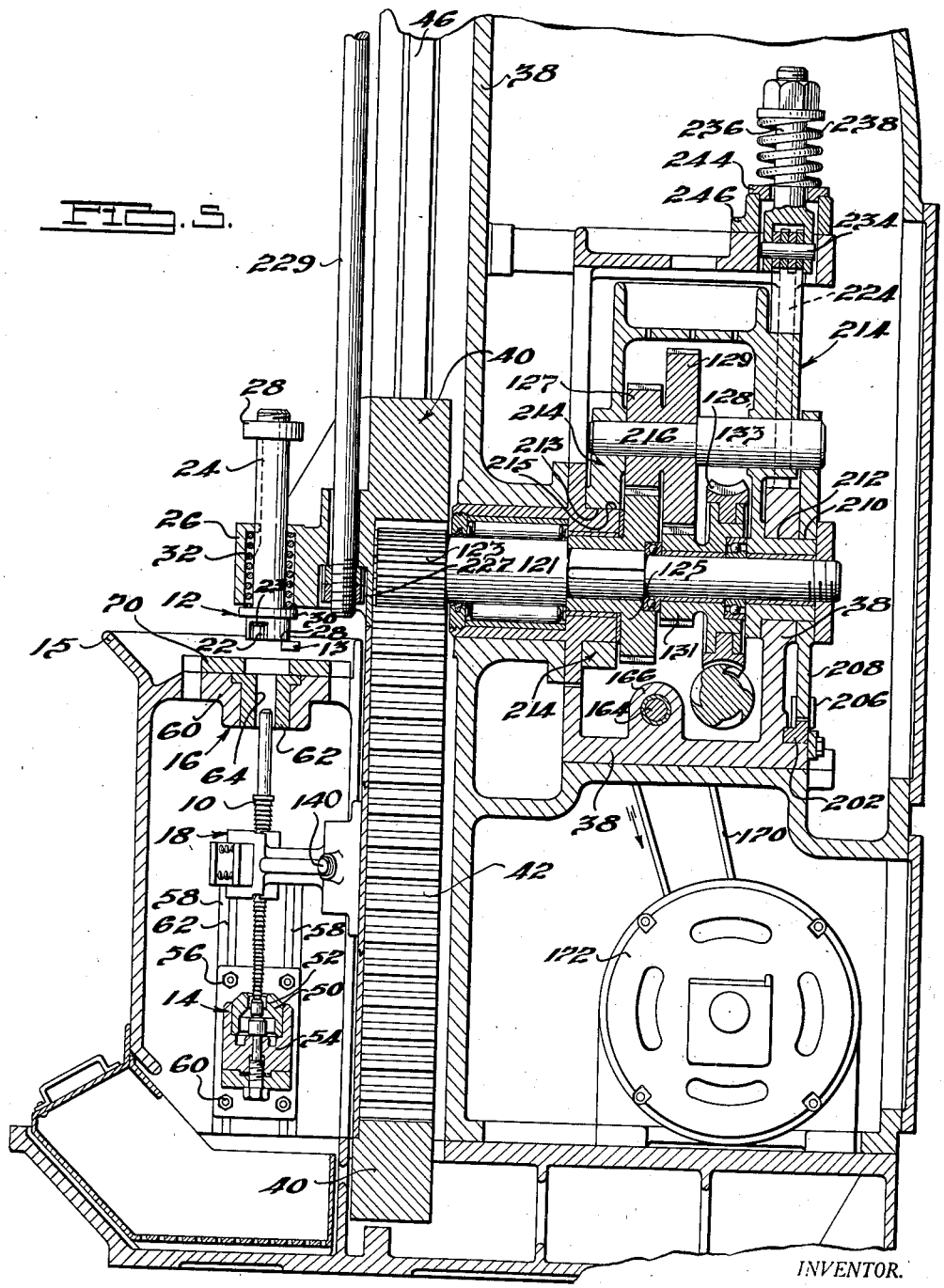

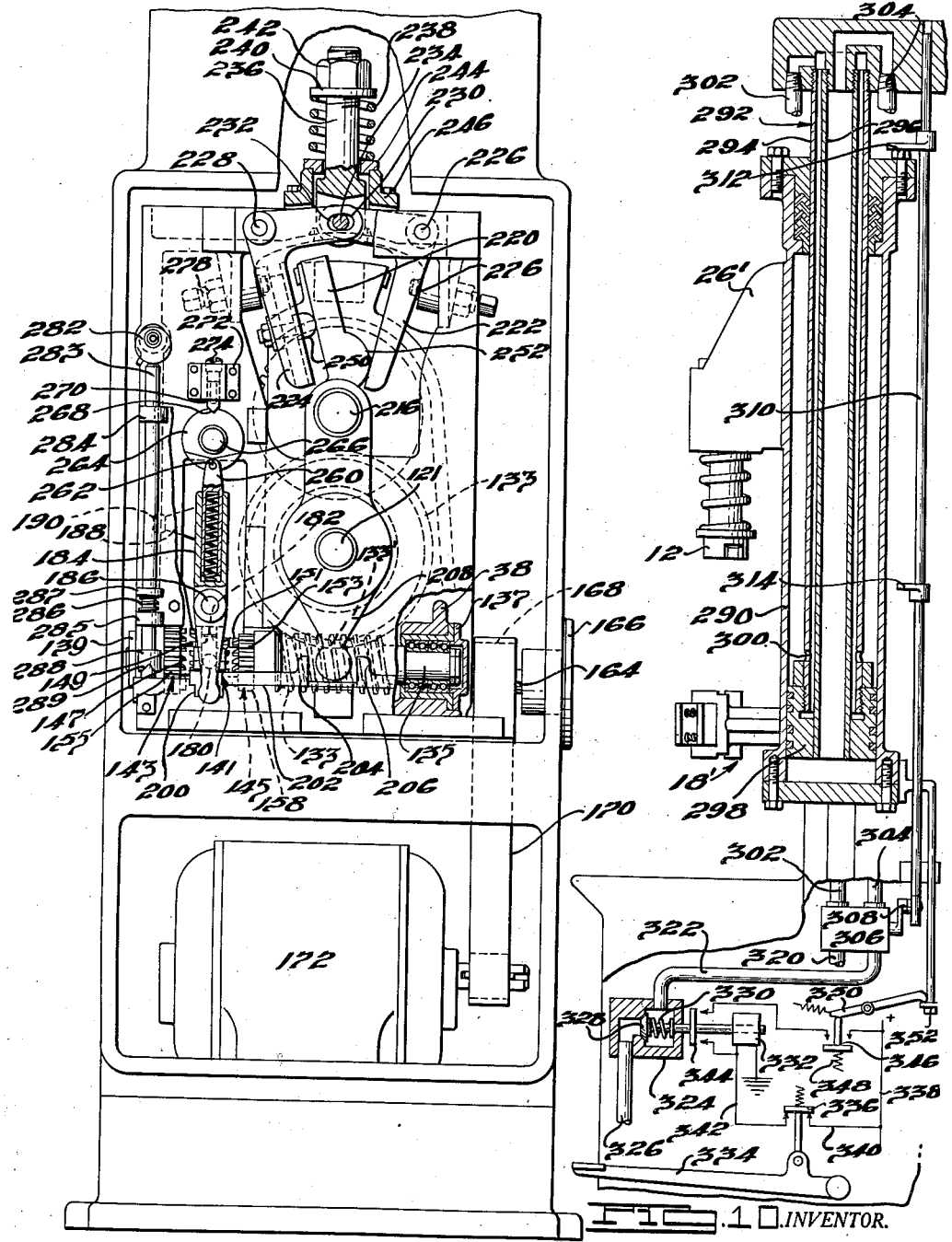

July 11, 1939.   R. A. THOMPSON   2,165,588
BROACHING MACHINE
Filed Jan. 24, 1936   5 Sheets-Sheet 5
FIG. 7.
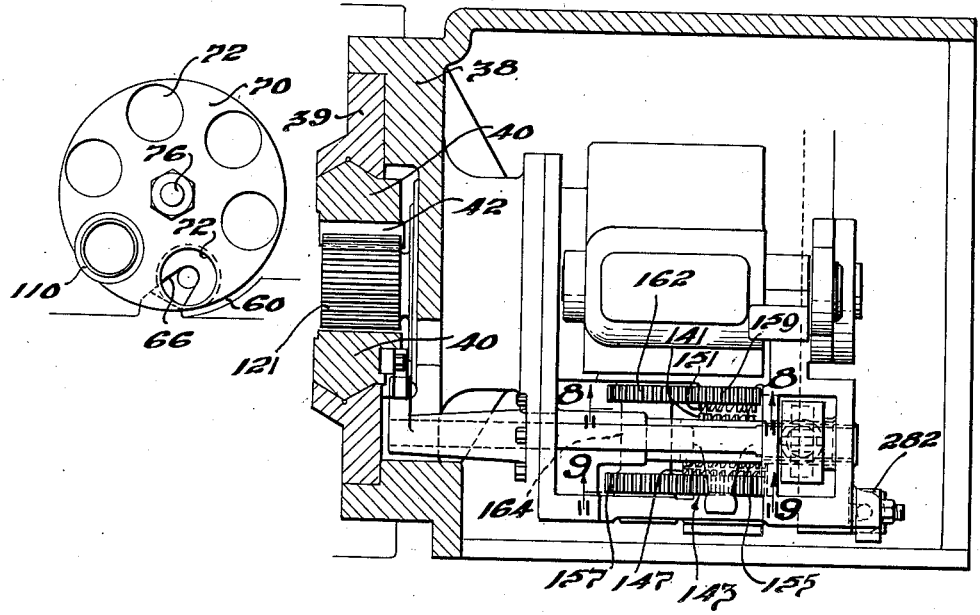
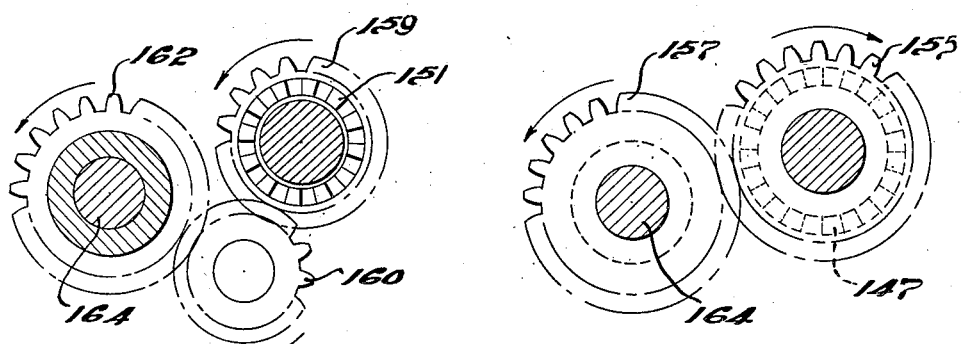
FIG. 8.   FIG. 9.
INVENTOR.
Richard A. Thompson.
BY
Harness, Dickey, Pierce & Hann.
ATTORNEYS.

Patented July 11, 1939

2,165,588

UNITED STATES PATENT OFFICE 2,165,588

BROACHING MACHINE

Richard A. Thompson, Detroit, Mich., assignor to Colonial Broach Company, a corporation of Michigan Application January 24, 1936, Serial No. 60,624

12 Claims. (Cl. 90—33)

The present invention relates to machine tools, and in particular, provides an improved automatic broaching machine.

Objects of the present invention are to provide an automatic broaching machine of the type in which the work to be broached is supported upon a stationary work table, and in which the broach is drawn through the work in a working direction, then displaced from the path of the working stroke and returned in a direction opposite to the working stroke direction, and then again positioned in the working path in readiness for a second stroke; to provide such a machine embodying a broach head to advance the broach through the work during the working stroke, and an additional member to receive the broach and return it to the starting position; to provide such a machine in which both the broach head and the return mechanism is operated by a single reciprocating member; to provide such a machine in which the broach is released from the broaching head at the conclusion of a working stroke and is received in a supporting socket preparatory to engagement by the return mechanism; to provide such a machine in which the return mechanism includes fingers adapted to grasp the broach intermediate its length, move it transversely of the path of its working stroke, move it through a return stroke, and again move the broach transversely to a position in alignment with its working path; and to provide such a machine in which the return mechanism is actuated by the same reciprocating member as actuates the broach head, and embodying co-operating cam controlled mechanism to effect the transverse movement of the return mechanism.

Further objects of the present invention are to provide a broaching machine embodying automatically controlled mechanism for feeding work pieces to the broach, and for conveying completed work pieces away from the broach; to provide such a feeding mechanism embodying a rotatable table having a plurality of spaced work stations, and means for successively notching the different stations of the table into alignment with the path of travel of the broach; and to provide such a machine in which the advancing mechanism for the feeding mechanism is responsive to the travel of the broach.

Further objects of the present invention are to provide, in an automatic broaching machine, power mechanism adapted to selectively provide continuous and uninterrupted operation on the broach through working and return movements, or to provide operation in which the broach is automatically stopped at the end of the working and return movements and may be started again manually; to provide such a machine embodying a manually operable control member, effective during the continuous operation of the machine, to bring the machine to rest at any point, and to reverse the operation thereof; and to provide in such a machine an additional and manually operated emergency stop member actuable to stop the broach and lock the operating mechanism in a position of rest.

Further objects of the present invention are to provide, in an automatic broaching machine, an improved mechanical drive for controlling the reciprocatory movements of the broaching head; to provide such a mechanical drive unit embodying a reversing member and means responsive to the approach of the broach head to a limit position for automatically actuating the reversing mechanism; to provide a drive for a broaching head embodying means to cushion the limiting movements of the broach head; and to embody in a mechanical drive unit means to selectively effect continuous operation of the broach, or to effect an automatic stopping thereof at each limit position, from which limit position the broach may again be started manually or by other means.

With the above and other objects in view, which appear in the following description and in the appended claims, preferred and illustrative embodiments of the present invention are shown in the accompanying drawing, throughout which corresponding reference characters are used to designate corresponding parts, and in which:

Fig. 1 is an external view in side elevation of the improved broaching machine of the present invention;

Fig. 2 is a view in front elevation, with certain of the parts broken away, corresponding to Fig. 1;

Fig. 3 is a fragmentary detailed view in horizontal section of the work feeding mechanism, and the broach return mechanism, taken on the line 3—3 of Fig. 2;

Fig. 4 is a detailed view of the actuating cam for the return mechanism, taken along the line 4—4 of Fig. 2;

Fig. 5 is a view in vertical central section, taken along the line 5—5 of Fig. 2;

Fig. 6 is a view in rear elevation, with the cover plate removed, showing the details of the mechanical drive and reversing mechanism;

Fig. 7 is a view in horizontal section, taken along the line 7—7 of Fig. 1;

Fig. 8 is a view of certain of the reversing gears, taken along the line 8—8 of Fig. 7;

Fig. 9 is a similar view of certain others of the reversing gears taken along the line 9—9 of Fig. 7; and Fig. 10 is a schematic view partially in section, of alternative operating mechanism.

Referring particularly to Figs. 1, 2, 3 and 5, the illustrated embodiment of the present invention is of the vertically disposed, push type, of machine, the broach 10 being forced downwardly from the elevated or starting position shown in Figs. 1 and 2, to the lower position shown in Fig. 5. The working or push movement is effected by the head 12. In its lower position, the broach is received within a socket designated generally as 14, from which it is automatically removed, moved transversely of the path of travel far enough to clear the work table designated generally as 16, then moved upwardly to a position adjacent the starting position and then again moved transversely to the starting position, all by the return mechanism designated generally as 18.

The broach head 12 comprises generally a cup-shaped portion 20, having a longitudinal slot 22 formed in one side thereof, through which the broach passes into the cup 20 when moved transversely thereof by the return mechanism 18, as later described. The edge 23 of the slot 22 is angled to provide a cam action, as later described. Cup 20 is either secured to or formed integrally at the lower end of a plunger 24. Plunger 24 is slidably supported in a boss 26 and is provided with a collar 28, which, with the lower collar 30, limits the sliding movements of plunger 24 within boss 26. A key 25 prevents rotation between plunger 24 and boss 26. A compression spring 32 surrounds plunger 24 and is received in an enlarged recessed portion of boss 26, the lower end of spring 32 bearing against the collar 30 and the lower end thereof bearing against the base of such enlarged recess. As will be evident, compression spring 32 biases plunger 24 and consequently broach head 12 to the position relative to boss 26 shown in Figs. 1 and 2, but permits movement of plunger 24 and broach head 12 to the position relative to boss 26 shown in Fig. 5. This later movement is effected at the beginning of a working stroke, in response to the engagement in a work piece of the broach 10, and the purpose of such movement is described later.

Boss 26 is shown as integrally formed with and as a part of an elongated cross head 40, which extends vertically of the machine and is provided with a central longitudinally extending opening, one side of which is provided with rack teeth 42. The respectively opposite lateral sides 44 of cross head 40 are adapted to ride in guides 46 suitably secured to the main machine frame 38.

The socket 14, which, as previously stated, receives the broach and supports it temporarily at the end of each downward or working movement thereof, comprises a socket member 50, having a central opening 52 therein large enough to receive the lower end of broach 10. One side of socket 50 is slotted to permit the broach to be moved out of it by the transverse movement of the return mechanism as later described. Socket 50 is supported in a bracket 54, which extends forwardly from a base plate 56. Base plate 56 is adjustably vertically along ways 58, which may form a part of the main machine frame, and may be locked in place thereon in any desired position of adjustment by a plurality of lock nuts 60, which enter T-slots 62 formed in ways 58. The vertical adjustment of the socket 14 is desirable to accommodate the machine to broaches of different overall lengths, as appears more clearly from the description of operation on the machine as a whole.

During each broaching operation, the work being broached (not shown) is supported upon the work table designated generally as 16, and which comprises a rigid frame portion 60, which extends forwardly from the main vertical portion of the machine and is provided with a conventional bushing 62, upon the top surface of which the work is disposed, and which is provided with a central opening 64 to accommodate the passage of the broach. The illustrated construction is such that at the conclusion of a broaching operation, the upper end of the broach 10 extends somewhat into the bushing 62, and for this reason, to permit the transverse movement of broach 10 as effected by the return mechanism as later described, bushing 62 and work table 60 are slotted as indicated at 66 in Fig. 7. The side openings in bushing 62 and table 60 are in vertical alignment with the previously mentioned side opening 22 formed in the broach head 12 and in socket 50, and as will be understood, extend in a direction corresponding to the path of transverse movement of the broach 10.

Preferably and as illustrated, the successive work pieces (not shown) are automatically moved to and carried away from the work table 16 as an incident to the broaching operation. The illustrated work feeding and removing mechanism comprises a replaceable circular feed plate 70, which as best shown in Figs. 3 and 7, is provided with a plurality of openings 72, each of a size corresponding to that of the work pieces. Plate 70 is removably and rotatably supported on the work table 60, and is keyed by a key 74 to a shaft 76 for rotation thereby. Shaft 76 extends downwardly through the work table 60 and at its lower end is provided with a bevel gear 78 which mates with and is driven by a corresponding bevel gear 80. Bevel gear 80 is secured upon a transversely extending shaft 82, the left hand end of which, as viewed in Fig. 2, extends outwardly from the machine and is provided with a squared section 84 to permit manual operation thereof when desired. Shaft 82 also carries a ratchet wheel 86, for cooperation with a spring pressed pawl 88, slidably secured in a bracket 90 carried upon a push rod 92. Push rod 92 is slidably journaled in the work table 60 and is urged to the upper position illustrated in Fig. 2 by a compression spring 94 which surrounds it, and the upper end of which bears against a collar 96 secured upon push rod 92. The lower end of spring 94 bears against a boss 98, through which the lower end of push rod 92 passes. As broach 10 approaches its lower limit of travel, a stop 102, adjustably secured upon a bracket 104, which in turn is secured to the broach head boss 26, engages the upper end of push rod 92 and forces it downwardly against the force of spring 94. During this movement, the pawl 88 rides over a tooth of the ratchet wheel 86, and does not cause movement of the latter. At the beginning of the upward movement of broach 10, stop 102 releases push rod 92, which thereupon moves upwardly under the influence of spring 94, the pawl 88 in this instance engaging a tooth of ratchet wheel 86 and notching the latter one step. The relation is such that the simple notching movement of ratchet wheel 86 as thus effected, is effective through shafts 82 and 76 and bevel gears 78 and 80, to move one opening 72 in feed plate 70 away from the working position and to bring the next adjacent opening 72 into the working position. Each notching movement accordingly moves a completed work piece away from the working position and advances a new work piece to the working position. Preferably and as illustrated, a magazine 110 is secured in stationary relation over the feed plate 70 and as the successive openings 72 move thereunder, work pieces stored in the magazine are carried away therefrom one at a time.

The return mechanism, designated generally as 18, and which as stated above serves to move the broach 10 transversely out of its path of movement and return it to its starting position, comprises a pair of spring pressed fingers 120 and 122 which are pivotally mounted by a pin 124 upon one arm of a bell crank 126. A compression spring 128, seated between the arms 120 and 122 urges the opposite ends of these arms together and causes them to grasp the broach 10. Bell crank 126 is pivotally mounted in vertically adjustable position upon the cross head 40 by a bracket 130 and one or more studs 132, the head of each of which is received in a T-slot 134 formed in the cross head 40. The other arm of bell crank 126 is formed as a cam face 140, which is disposed to ride in a cam track 142 formed in a cam plate 144, secured in adjustably fixed relation to the main machine frame 38 by studs 146. Cam track 142 is provided with spaced angled upper cam surfaces 148 and 150 and lower angled cam surfaces 152.

The cam mechanism is shown in Fig. 4 in the position occupied by the parts thereof at the beginning of a downward or working stroke of broach 10. In operation, a downward movement of broach 10, as effected by broach head 12 and boss 26 through cross head 12, is accompanied by a corresponding downward movement of return mechanism 18, also effected through cross head 40. During the initial portion of this downward movement of the return mechanism 18, the end 140 of bell crank 126 rides against the vertical cam portion 154 of cam track 142, during which movement return mechanism 18 moves in alignment with broach 10. Shortly after the lower end of broach 10 enters the new work piece and becomes fixed therein, the end 140 of bell crank 126 engages and rides along the inclined cam track portion 150, which movement cams the return mechanism 18 in a counter-clockwise direction as viewed in Fig. 3. The broach 10 being supported at both ends at this time, the jaws 120 and 122 are forced apart against the force of compression spring 128, and thus move away from the broach. Throughout the remainder of the downward or working stroke of broach 10, the end 140 of bell crank 126 rides along the vertical portion of cam track 142. As the end of the downward stroke is approached, end 140 reaches the inclined cam portion 152 of cam track 142 and cams the return mechanism 18 in a clockwise direction, as viewed in Fig. 3. This camming movement is effected shortly after the completion of the broaching operation, and also shortly after broach 10 falls freely away from broach head 12 and is received in the socket 14. At this time, as previously described, the upper end of the broach is still guided within the opening formed in the work table 16. The camming movement of the return mechanism 18 forces the jaws 120 and 122 over the broach 10, causing these jaws to grasp the broach. At the beginning of the return movement or upward movement of the cross head 40, the end 140 of bell crank 126 rides back along the inclined cam portion 152 of cam track 142, again camming the return mechanism 18 in a counter-clockwise direction, as viewed in Fig. 3, moving the broach laterally out of socket 14 and also out of the slot in the work table 16. The transverse movement of the broach as thus effected is great enough to clear the work table and permit a free upward movement of the broach. As the limit of the upward movement of the cross head 40 is approached, the end 140 of bell crank 126 engages the inclined cam track portion 148, again camming the return mechanism 18 in a clockwise direction, as viewed in Fig. 3, to a position in which the jaws support the broach in axial alignment with the broach head 12, the extreme end of the broach 10 during this movement initially engaging the angled face 23 of slot 22, and camming head 12 upwardly against the force of spring 32 enough to permit broach 10 to enter the head, after which head 12 again snaps down over the end of broach 10.

Considering now the preferred construction of mechanical reversing and power units for effecting the reciprocating movements of the cross head 40, and referring paticularly to Figs. 5, 6, 7, 8 and 9, a main drive shaft 121 is provided at one end with a pinion 123, which meshes with the rack 42 formed in cross head 40. As will be evident, rotation of pinion 123 in one direction or the other causes rack 42 and consequently cross head 40 to correspondingly move upwardly or downwardly, carrying with it the previously described broach head 12 and the return mechanism 18. Shaft 121 has keyed thereto a gear 125, in continuous mating relation to a gear 127 formed in clustered relation to a larger gear 129. Gear 129 is in continuous mating relation to a gear 131 disposed in clustered relation to a worm wheel 133 which in turn is driven by a worm 133'.

As best seen in Fig. 6, worm 133' is carried upon a shaft 135, provided with suitable bearings 137 and 139 in the machine frame 38, and to which a double faced clutch element 141 is splined. Cooperating clutch elements 143 and 145 are also carried by shaft 133 and, while suitably secured in place axially thereof, are freely rotatable with respect thereto. Clutch element 143 is provided with clutch teeth 147 which cooperate with corresponding teeth 149 on the slidable clutch element 141 to effect a driving relation between the two and clutch element 145 is provided with clutch teeth 151, which cooperate with corresponding teeth on the corresponding face of clutch element 141, to effect a driving relation between the two latter elements.

Clutch element 143 also includes a pinion 155, which as best shown in Figs. 7 and 9, continuously meshes with a driving pinion 157. Pinion 159, forming part of clutch element 145, is in continuous mating relation to an idler pinion 160, which in turn is in continuous mating relation to a driving pinion 162. Driving pinions 156 and 162 are carried upon a common shaft 164, suitably journaled in the machine frame, as at 166, and provided adjacent one end with a drive pulley 168, by which, through belt 170, pinions 156 and 162 may be uni-directionally driven from a suitable external source such as the electric motor 172.

With the arrangement as thus far described, it will be evident that uni-directional rotation of the drive shaft 164 causes rotation in one direction of the clutch pinion 155, through the drive pinion 157, and causes rotation in an opposite direction of clutch pinion 159, through the idler pinion 160 and the drive pinion 162. Accordingly, if the slidable clutch element 141 is moved to the right, as viewed in Fig. 6, by the mechanism hereinafter described, a driving relation is effected between the clutch elements 141 and 145 and consequently between the external source and the worm shaft 135, causing the latter element to rotate in a selected direction, and to cause rotation in a corresponding direction of the rack pinion 123, through the previously mentioned gears 127, 129, 131, 133 and 133'. Similarly, if the slidable clutch member 141 is moved to the left, as viewed in Fig. 6, bringing the clutch teeth thereof into engagement with the clutch teeth of clutch element 143, a corresponding driving relation is effected between the external source and shaft 135, which results in rotation of the rack pinion 123 in the opposite direction. Depending, accordingly, upon whether the slidable clutch element 141 occupies the illustrated neutral position, a left hand position, or a right hand position, as viewed in Fig. 6, rack pinion 123, and consequently the machine as a whole, either remains at rest or moves continuously in one direction or the other. The arrangement is such that when clutch element 141 is in its left hand position, rendering clutch pinion 155 effective, a downward movement of cross head 40 results, and when in the opposite position, rendering clutch pinion 159 effective, an upward movement of cross head 40 results. As clearly appears in Figs. 8 and 9, gear 155 is larger than gear 159, so that a greater gear reduction is effected between driving motor 172 and cross head 40 during the downward or working stroke than during the upward or return stroke. Accordingly, during the working stroke a relatively slow rate of movement is provided, and during the return stroke a relatively rapid rate of movement is provided.

Considering now the mechanism for automatically controlling the movement of the slidable clutch element 141 between its neutral and its two limit positions, as above described, a trunnion 180 is either formed integrally with or suitably secured to the outer face of the clutch element 141 in transversely extending relation thereto, and slides in a suitable slot 182 formed in the lower portion of a shifting arm 184. Arm 184 is suitably pivotally mounted upon a shaft 186, which is in turn journaled in the main machine frame. A lateral extension 188 formed on arm 184 terminates in a spheroidal portion 190, adapted to form a swivel connection with a manual control member 192 (Fig. 1, not shown in Fig. 6), which extends through a suitable opening in the machine frame and is pivotally connected to a manual control lever 194, disposed on the face of the machine in position for convenient actuation by the machine operator. As will be evident, from Fig. 1, rotation of control lever 194 in a clockwise direction effects clockwise rotation of clutch lever 184, Fig. 6, and moves the slidable clutch member 141 along shaft 135 into clutching relation to clutch pinion 155, resulting, as previously described, in a downward or working stroke of broach head 12 and return mechanism 18. Similarly, rotation of control lever 194 in a counter-clockwise relation effects an opposite action, clutching the slidable clutch member 141 to the pinion 159 and effecting a reverse or upward movement of the broach head 12 and return mechanism 18. When in the position illustrated in Fig. 1, the control handle 194 maintains the slidable clutch element 141 on the neutral position corresponding to a position of rest of the broach head 12 and return mechanism 18.

The lower end of the arm 184, as viewed in Fig. 6, is received in a notch 200, formed in a cross bar 202, slidably supported in the machine frame, and also provided intermediate its ends with two upwardly directed extensions 204 and 206, positioned in suitable spaced relationship, and between which the lower end of an automatic clutch lever 208 is received. The automatic clutch lever 208 is provided with a central opening 210, into which one hub 212 of a centralizing frame 214 is fitted. The other hub 213 of frame 14 fits over a frame boss 215. At its upper end, the automatic clutch arm 208 is fixed to the shaft 216, which carries the previously mentioned cluster gears 126 and 128.

As is evident from Fig. 5, the main shaft 121, which is journaled in the main machine frame 38, directly at the left hand end thereof, and indirectly at the right hand end thereof through the centering frame 214, acts as a fixed center about which the frame 214 and the automatic clutch arm 208 may pivot. The shaft 216, which carries the cluster gears 126 and 128, is journaled entirely in the centering frame 214 and thus moves therewith about shaft 121 as a center.

Referring further to Figs. 5 and 6, an upwardly extending dog 220, formed integrally with or suitably secured to the centering frame 214, lies between a pair of spring biased bell cranks 222 and 224, which are pivoted to the main machine frame by trunnions 226 and 228 respectively. Corresponding ends of bell cranks 222 and 224 are provided with elongated slots 230 and 232, respectively, in transverse registry with each other, and which receive a pin 234 carried at the lower end of a plunger 236, which is movable vertically through the machine frame and is biased to the uppermost position thereof illustrated in Fig. 6 by a compression spring 238, the upper end of which bears against a washer 240 retained in place by a nut 242, and the lower end of which bears against a collar 244, which seats against bracket 246 secured to the machine frame. Plunger 236 thus urges the lower ends of the bell cranks 222 and 224 together.

A stop pin 250, adjustably secured in the lower arm of bell crank 224, is disposed to engage one face of the dog 220 and the lower arm of bell crank 222 is in sliding relation to a cam 252 formed on the dog 220. The dog 220 and the bell cranks cooperate to normally retain frame 214 and the automatic clutch arm 208 in the vertical or neutral position illustrated in the various figures. It will be apparent, however, that the power transmitted between the worm shaft 135 and the rack shaft 121, through the cluster gears 127 and 129, tends continuously to rotate frame 214 (in which the latter two gears are journaled) about the axis of shaft 121. This tendency to rotation is resisted by the spring pressed plunger 236. When, during operation, however, a positive limit is imposed to the rotation of pinion shaft 121, as by limiting the movement of the cross head 40, or when the opposing force exceeds the force exerted by the spring pressed plunger 236, frame 214 rotates bodily around the axis of pinion shaft 121, compressing plunger spring 236 through one or the other of bell cranks 222 and 224 and dog 220, and correspondingly rotating the automatic clutch arm 208 about the axis of shaft 121. The latter rotation moves the lower end of automatic clutch arm 208 to the right or to the left, as viewed in Fig. 6, bringing it into engagement with bracket 204 or bracket 206, associated with the clutch bar 202. The motion of the latter element correspondingly actuates the previously described clutch arm 184. As illustrated, stops 225 and 227 carried upon rod 229, which passes through bushing 26, provide positive stops to the movement of cross head 40, to initiate the reversing action, as above described.

The upper end of clutch arm 184 is provided with a spring pressed detent 260, pivoted at its upper end by pin 262 to a disc 264, which is rotatably supported upon the main machine frame to trunnion 266. Disc 264 is provided on its periphery with a notch 268, into which the end of a spring pressed detent 270 is normally urged by the spring associated with the latter. Detent 270 is supported from the main machine frame upon a bracket 272, and may be retracted by a screw 274 to a position in which it is ineffective to cooperate with the notch 268 in disc 264. Detent 260 and the rotatable disc 264 thus constitute a toggle connection tending to urge clutch arm 184 to either a right hand or left hand extreme position. Detent 270 and notch 268, however, cooperate to form a stop tending to hold clutch arm 184 in the neutral or illustrated position.

The movement imparted to the automatic clutch arm 208 through rotation of the centering frame 214, as previously described, while limited by adjustable stationary stops 276 and 278, is sufficient to throw clutch arm 184, through clutch bar 102, from one extreme position, slightly past the center position, but not sufficiently far to move notch 268 out of the range of detent 270. If, therefore, detent 270 is screwed down to the position illustrated in Fig. 6, in which it is effective to cooperate with notch 264, it interrupts the motion of the clutch arm 184 and retains the latter in the neutral position. If, however, detent 270 is retracted out of effective relation to notch 268, a movement of clutch arm 184 slightly past the toggle position, through clutch bar 202, and automatic clutch arm 208, renders detent 260 and disc 264 effective to continue the motion of clutch arm 184 to the opposite extreme position. Depending therefore upon the position of detent 270, the action centering frame 214 and automatic clutch arm 208 may result either in merely unclutching the movable clutch member 141 and stopping the machine, or may result in throwing clutch arm 184 to the opposite extreme position, resulting in a reversal of motion of the machine.

Preferably, and as illustrated, a manually controlled emergency stop mechanism is provided, which may be actuated at any time during the travel of the machine, regardless of its direction of travel, to bring the machine to rest, and to positively lock the operating mechanism against actuation. Referring particularly to Figures 2 and 6, an emergency lever 280 is positioned on the front of the machine for actuation by the operator thereof, and through a shaft 281, controls a cam 282, which, in turn, is effective to either positively force downwardly a push rod 283 (journaled in bosses 284 and 285) or to permit push rod 283 to rise under the influence of a spring 286, seated between boss 285 and a collar 287 carried by push rod 283. The lower end 288 of push rod 283 is provided with a notch, which registers with a finger 289 secured to the previously mentioned clutch actuating slide 202. As will be evident, when push rod 283 is in the emergency stop position illustrated in Figure 6, the notch and finger 289 cooperate to positively lock clutch bar 202 in the neutral or central position, in which all of the operating elements are maintained in positions of rest. Rotation of handle 280, however, to permit push rod 283 to rise under the influence of spring 286, releases finger 289 and consequently clutch bar 202 from push rod 283, and permits the operating mechanism to be thrown to either one or the other of its limiting positions to effect operation in a corresponding direction. The width of the notch in the lower end of push rod 283 is such that finger 289 lies between the limits thereof when the clutch bar 202 is in either limit position, so that, if emergency handle 280 is thrown to stop position during operation of the machine, the consequent downward movement of push rod 283 cams finger 289 and consequently clutch bar 202 from such limit position to the central or stopping position and results in stopping the machine.

Considering now the operation of the machine as a whole, and as previously stated, the mechanism is illustrated in Figs. 1 and 2 in the position occupied by the parts at the upper or starting position of broach 10, broach 10 having been moved into the broach head 12 by the return mechanism 18 as a consequence of the immediately preceding return stroke of the mechanism. It may be assumed also that a new work piece is positioned upon the work table 16, this positioning having been effected by the previously described feeding mechanism including the table 70.

Release of the emergency handle 280, which, as just described, is shown in the stop position, releases the clutch actuating bar 202 (Fig. 6) and conditions the machine for operation. With the machine thus conditioned, movement of the starting handle 194 in a clockwise direction, as viewed in Fig. 1, rotates the starting clutch arm 184 in a clockwise direction, as viewed in Fig. 6, bringing clutch element 141 into engagement with the left hand clutch element 143, and clutching worm shaft 135 to the external source of power for operation in a direction to cause downward movement of the broach carrying cross head 40, as previously described.

The downward movement of cross head 40 is accompanied by a corresponding downward movement of the return mechanism 18 and the broach head 12. Return mechanism 18 is directly carried by cross head 40, and broach head 12 is carried downwardly thereby under the influence of the compression spring 32, seated between it and the boss 26. During this initial downward movement, the cam 140 associated with the return mechanism 18 rides along the dwell 154 of the cam track 142 (Fig. 4), so that no transverse movement of the return mechanism 18 results. Shortly after the lower end of broach 10 enters the work piece (not shown) previously positioned upon the work table 16 by the feeding mechanism, the cam 140 associated with the return mechanism 18 engages the angled cam portion 150 of cam track 142, resulting in a transverse rotation of return mechanism 18. At this time, the upper end of broach 10 is supported within the cup of head 12 and the lower end is supported within the work piece. Both ends of the broach being supported, the transverse movement of return mechanism 18 forces the jaws 120 and 122 thereof apart sufficiently to release mechanism 18 from the broach. As will be understood, different operating conditions may require different initial movements of broach 10 from the starting position to a position in which support for the lower end of the broach is afforded by the work piece. As previously stated, however, the cam track 142 is readily replaceable, and for such differing operating conditions, cam tracks may be used to provide correspondingly differing lengths of dwell of the cam, as represented by the cam portion 154.

The engagement of the teeth of broach 10 in the work piece imposes a resistance to the downward movement of broach 10, the adjustment of the machine being such that this resistance is encountered shortly after the retraction of the return mechanism as previously described. The resistance to the advance of the broach results in compressing the spring 32 associated with the broach head 12 until the collar 30 engages the under side of the boss 26, at which time a positive driving force is applied to broach 10 through boss 26, and continued downward movement of cross head 40 results in corresponding downward working movement of broach 10.

At the conclusion of the operation, that is, when the teeth of the broach have passed entirely through the work piece (not shown), broach 10 falls freely downwardly away from the broach head 12, to substantially the position shown in Fig. 5, in which position, the lower end thereof is supported within the socket 50 of the mechanism 14 and the upper end thereof is supported within the previously described bushing 64 associated with work table 16. At the time of the release of broach 10 from the work, broach head 12 is urged downwardly further by the compression spring 32 associated therewith, and may move downwardly somewhat from the position illustrated in Figure 5. In the illustrated arrangement, this downward movement is limited by a mechanical stop 13 carried by the apron 16 which surrounds the work table 16, and against which the under side of the collar 30 bears. A stop 13 is positioned above the level of the feed table 70, and thus does not interfere with the rotation thereof.

Just prior to the release of the broach and conclusion of the broaching operation as just described, the downward movement of the return mechanism 18, as effected by cross head 40, brings the cam 140 associated with the return mechanism into engagement with the angled portion 152 of cam track 142 (Fig. 4), which action results in a swinging of the return mechanism from the retracted running position to the broach engaging position shown in Fig. 5. This inward swinging of the return mechanism continues during the period of free fall of broach 10, and shortly after broach 10 is received in socket 14, the fingers of the return mechanism 18 engage and pass over the broach 10. During the grasping motion of return mechanism 18, the upper and lower ends of broach 10 are positively supported in the work table 16 and in the socket 14 respectively. It will be noted that because of the transverse slots in work table 16 and socket 14, these members are ineffective to prevent broach 10 from tilting during or at the conclusion of the period of free fall of the broach.

Any such tilting as may occur, however, is intercepted by the approach of the return mechanism 18. It is found in actual practice that substantially no tilting tends to develop until after the lower end of the broach is received within the socket 14, by which time, as just described, the return mechanism 18 has substantially reached a broach grasping position.

The arrival of the cam 140 associated with return mechanism 18 at or about the lower limit of the angled portion 152 of cam track 142 occurs substantially simultaneously with the arrival of cross head 40 at its lower limit of travel, represented by the engagement of boss 26 with the limit stop 227 associated with rod 229 (Fig. 5). The latter engagement, by positively preventing further downward movement of cross head 40, causes the cluster gears 127 and 129 to rotate bodily around the associated cluster gears 125 and 131, resulting in a corresponding rotation of the centering frame 214, as previously described. This rotation, through the automatic clutch arm, the clutch bar 202, and the slidable clutch member 141, disengages the clutch member 149 from the left hand clutch element 143 (Fig. 6), thus disconnecting the rack shaft 42 from the external source of power, and stopping the machine.

As previously described, the movement of clutch bar 202 as effected by automatic clutch arm 208 moves the clutch 184 just past the toggle point of detent 260, but not far enough to bring the disc 264 out of range of the stopping detent 270. With the latter detent in the position shown in Figure 6, accordingly, clutch arm 184 is brought to rest at its midpoint or neutral position, and the machine remains at rest. It will be understood that as soon as clutch element 142 is disconnected from the clutch element 143, the forces tending to cause rotation of the centering frame 214 disappear and this frame accordingly resumes its illustrated central position under the influence of the plunger spring 238. This centering movement, by moving automatic clutch arm 208 away from the clutch bar 202, permits accurate centering of clutch arm 184 by detent 270.

To begin a return movement, the manual starting control member 194 may be moved in a direction to throw clutch arm 184 in a counterclockwise direction, bringing the slidable clutch control member 141 into engagement with the right hand clutch element 145, thus connecting cross head 40 to the external source of power for operation in an upward or return direction.

Alternatively, if it is desired that the machine shall automatically start a return movement at the conclusion of the working stroke, the detent 270 may be retracted as previously described by screw 274, to a position in which it is ineffective to cooperate with the disc 264. If the parts are thus adjusted, the action of clutch arm 184, through the automatic clutch arm 280 and clutch bar 202, at the conclusion of the working stroke as just described, by throwing arm 184 just past the toggle point of detent 260, renders the latter element and disc 264 effective to continue the movement of clutch arm 184 to the opposite position, in which clutch member 141 engages the right hand clutch element 145, completing connections to cause upward movement of cross head 40.

The upward starting movement of cross head 40, as initiated either manually, by lever 194, or automatically, as just described, causes the cam 140 associated with the return mechanism to ride back along the angled portion 152 of cam track 142, correspondingly swinging the return mechanism to a position at one side of the path of travel of the broach during a working stroke, in which retracted position it clears the work table 16 and associated structure. During this retracting movement of the return mechanism 18, the upper and lower ends of broach 10 pass freely through the side openings previously described in the work table 16 and in the socket 14. The upward movement of cross head 40 is also accompanied by a corresponding upward movement of boss 26. Because of the influence of spring 32 upon broach head 12, however, the latter element remains in the position shown in Figure 5, until the upper surface of boss 26 engages the upper collar 28 associated with broach head 12. At this time, upward movement of broach head 12 is begun and continues simultaneously with the upward movement of the return mechanism 18. It will be understood, that the lost motion thus introduced between the movement of return mechanism 18 and broach head 12, at the beginning of the broaching action as previously described, and at the beginning of a return movement, is substantially equal to, and is provided to compensate for, the free fall of the broach which occurs at the conclusion of a broaching operation.

The approach of the cross head 40 to the lower limit of travel also presets the ratchet mechanism associated with the feed table 70, as previously described, and, as the cross head 40 starts upwardly, the ratchet mechanism notches feed table 70 around one notch, this notching movement occurring at a time when the broach is free of the work table 16, and resulting in bringing a new work piece into registry with the work table 16.

As the upper limit of the travel of cross head 40 is approached, the cam 140 associated with the return mechanism engages the angled portion 148 of cam track 142 (Fig. 4) and initiates a transverse movement of the return mechanism and broach 10, which latter element is at this time above the level of the work table 16, in substantially the position shown in Figures 1 and 2. As the transverse movement of return mechanism 18 progresses, the upward end of broach 10 engages the angled face 23 of broach head 12, and cams the latter upwardly against the force of compression spring 32, this upward camming movement being sufficient to permit the upper end of broach 10 to enter broach head 12, at which time the latter snaps back down over the end of broach 10, so that one face of the cup 20, immediately above the lateral slot 22 of head 12, is effective to provide lateral support for broach 10 at the time that the return mechanism is retracted away therefrom in the initial working movement.

The arrival of the cam 140 of the return mechanism 18 at the upper end of the angled portion 148 of cam track 142, as just described, occurs substantially at the same time as the arrival of the cross head 40 at its upper limit of travel, as determined by the engagement of the upper surface of boss 26 with the stop 225. This latter engagement results in either stopping or reversing the travel of cross head 40, dependent upon the position of the stopping detents 270 (Fig. 6), in substantially the manner described with reference to the stopping and reversing at the lower limit of travel. In the former case, a new work cycle may be initiated by handle 194, and in the latter case, is initiated automatically, the new cycle being in all respects a duplicate of the described cycle.

As an alternative to the mechanical drive mechanism described above, the broach head 12 and return mechanism 18 may be reciprocated back and forth by fluid pressure mechanism. A preferred arrangement for operating broach head 12 and the return mechanism 18 in this manner is of the type described and claimed in the copending application of the present applicant, Serial No. 42,619, filed September 28, 1935, and assigned to the same assignee as the present application, and diagrammatically shown in Fig. 10. Referring to the latter figure, the broach head 12 and boss 26' associated therewith and the return mechanism 18' are supported upon the casing 290 of a fluid pressure operated cylinder, which is in turn reciprocable vertically upon a hollow piston rod 292 associated therewith and which may be suitably and stationarily supported from the main machine frame at its lower and upper ends. Piston rod 292 is formed of two concentric tubes 294 and 296, both of which are suitably secured at their lower ends to a suitable piston 298. The outer tube 294 communicates through side ports 300 with the interior of casing 290 above piston 298. The inner tube 296 extends through the piston 298 and thus communicates with the interior of cylinder 290 below piston 298. Fluid pressure lines 302 and 304 communicate with the interiors of tubes 294 and 296 respectively, and also lead to a suitable conventional reversing valve 306, the control arm 308 of which is disposed for actuation by a push rod 310, provided with collars 312 and 314. The upper collar 312 is engaged by casing 290 as the machine approaches an upper limit of travel and throws the control arm 308 of valve 306 to a reverse position, in which it is effective to connect the lines 302 and 304 to exhaust and supply lines respectively. When the machine approaches a lower limit of travel, cylinder 290 engages collar 314 and moves push rod 310 and control lever 308 in a direction to reverse valve 306, and connect lines 302 and 304 to supply and exhaust lines respectively.

The exhaust line is indicated at 320 and may lead to a suitable sump. The supply line is indicated at 322 and leads, through an electromagnetically controlled supply valve 324 to a supply line 326. The plunger 328 of valve 324 is normally urged to a valve closing position by a compression spring 330, but may be retracted to an open position upon energization of an electromagnet 332, the circuit for which is arranged for combined manual and automatic control. The parts are shown in a starting position corresponding to Fig. 1, and to initiate a complete operating cycle, foot pedal 334 may be depressed, closing switch 336 and completing an energizing circuit for electromagnet 332, extending from the plus line 338, through the conductor 340, switch 336, conductor 342, electromagnet 332, and thence to ground. Upon completion of this circuit, electromagnet 332 actuates valve 324 to the open position, connecting reversing valve 306 to the source of fluid pressure. At this time, as described above, reversing valve 306 is in a position to cause downward movement of cylinder 290 and consequently of the broach head 12 and the return mechanism.

At the beginning of the downward movement of cylinder 290, as just effected, the collar 352, which is either carried by or otherwise movable directly with cylinder 290, releases the switch 350, and permits the holding switch 348 to close, thus completing the previously described holding circuit for electro-magnet 332. Upon completion of this circuit, foot pedal 334 may be released without effect upon the operation of the machine.

Upon the arrival of cylinder 290 at the lower limit of its travel, collar 314 is engaged thereby, and throws reversing valve 308 to the opposite position, completing connections to cause upward travel of cylinder 290, switch 348 being unaffected by this operation. Upon completion of the just mentioned reverse connections, cylinder 290 starts upwardly. At the conclusion of its upward movement, collar 312 is again engaged and throws reversing valve 306 to a position to cause downward travel of cylinder 290. The arrival of cylinder 290 at its upper limit also brings collar 352 into engagement with switch arm 350, resulting in the opening of switch 348 and a consequent de-energization of electro-magnet 332. The latter action permits the main valve 324 to move to a closed position, shutting off the supply of fluid pressure, and bringing the system to rest at the upper limit position.

It will be understood that in all other respects, as regards the operation of the feeding mechanism, the return mechanism and other elements directly associated with broach 10, the operation of the machine as a whole, utilizing the fluid pressure mechanism of Figure 10, is as described with reference to the mechanically driven embodiment of the present invention.

It will be evident from the foregoing that the present invention provides a fully automatic broaching machine, selectively adjustable to provide either continuous operation, or to provide operation by which the machine is automatically brought to rest at either both the upper and lower positions of travel or at only the upper position of travel; in which the only manual operations involved are the removal from the work table of the completed work pieces, and the feeding into the magazine of new work pieces. It will also be evident that although specific embodiments of the present invention have been described in detail, various modifications in the form, number and arrangement of parts may be made within the spirit and scope of the present invention. Moreover, it will be understood that certain features of the present invention may be utilized independently of other features thereof, and may also be utilized for purposes other than the specific purposes described herein. The described embodiments accordingly are to be regarded in an illustrative and not in a limiting sense.

I claim as my invention:

1. A broaching machine for operating a broach, comprising, in combination, a broach head for moving said broach in one direction from a starting position through a working stroke and adapted to release the broach at the conclusion of such stroke; a work table disposed to support a work piece in the path of travel of said broach and having an opening therethrough to accommodate passage of the broach; and return mechanism rendered effective at the conclusion of said working stroke for moving said broach to said starting position, including means to effect said return movement along a path displaced from the path of said working stroke as said head is returned along its initial path of movement.

2. A broaching machine for operating a broach, comprising, in combination, a broach head effective to move said broach in one direction through a working stroke and adapted to release said broach at the conclusion of said stroke; return mechanism rendered effective after said release to return said broach through a return movement in an opposite direction along a path as said head is returned along its initial path of movement displaced from said working path; and additional means for supporting said broach after release by said broach head and before operation of said return mechanism.

3. A broaching machine for operating a broach comprising, in combination, a broach head member for moving said broach in one direction through a working stroke and adapted to release the broach at the conclusion of such stroke; a return member for moving said broach in an opposite direction through a return stroke; a reciprocating element common to both of said members for effecting the movement thereof in said working and return directions; and means mounting said return member upon said reciprocating element for transverse movement relative thereto.

4. A broaching machine for operating a broach comprising, in combination, a broach head member for moving said broach in one direction through a working stroke and adapted to release the broach at the conclusion of such stroke; a return member for moving said broach in an opposite direction through a return stroke; a reciprocating element common to both of said members for effecting the movement thereof in said working and return directions; means mounting said return member upon said reciprocating element for transverse movement relative thereto; and means rendered effective in accordance with the movement of said return member for effecting said transverse movement.

5. A broaching machine for operating a broach comprising, in combination, a broach head member for moving said broach in one direction through a working stroke and adapted to release the broach at the conclusion of such stroke; a return member for moving said broach in an opposite direction through a return stroke; a reciprocating element common to both of said members for effecting the movement thereof in said working and return directions; means mounting said return member upon siad reciprocating element for transverse movement relative thereto; and means including cam mechanism rendered effective by the travel of said return member for swinging said return member between a position aligned with the path of said working stroke and a return position displaced from said path.

6. In a broaching machine for operating a broach, means for moving the broach between predetermined spaced positions including related clamping fingers adapted to grasp the broach between them; means for moving said fingers in a direction parallel to the axis of said broach; and cooperating means rendered effective by the travel of said fingers in said just mentioned direction for effecting a movement of said fingers in a direction transverse to said just mentioned direction.

7. In a broaching machine for operating a broach and having a crosshead reciprocable over a predetermined path, means for effecting said reciprocating movement including a rotatable shaft; a second rotatable shaft; gears carried by said shafts and disposed in mating relation; means rotatably mounting said second shaft for bodily movement around said first shaft as a center; and means controlled by said bodily movement for controlling the rotation of said first shaft.

8. In a broaching machine for operating a broach and having a member reciprocable between predetermined limits, means for effecting said reciprocation, including a first rotatable shaft; a second rotatable shaft; means for driving said shafts including a reversing clutch mechanism; gears carried by said shafts respectively and disposed in mating relation to each other; means rotatably journalling said second shaft for bodily movement about the axis of said first mentioned shaft as a center; and means responsive to said bodily rotation for actuating said reversing clutch mechanism.

9. In a broaching machine, a work piece supporting element, an actuating head disposed on one side of said element, a broach receiving element aligned with said head and disposed on the opposite side of said element, a broach actuable by said head through said work piece to said securing element, and means actuated on the return stroke of said head for releasing said broach from said securing element and returning said head through a path other than the work path as said head is returned along said work path.

10. A broaching machine for operating a broach comprising in combination, a broach head disposed to engage the broach and move it from a starting position in one direction through a working stroke and adapted to release the broach at the conclusion of such stroke; operating means for causing said broach head to move through said working stroke and to return to said starting position; and return mechanism for returning said broach to said starting position at the conclusion of said working stroke, said return mechanism including means to displace the broach from the path followed thereby during said working stroke to a second path and for moving said broach along a second path to said starting position.

11. A broaching machine for operating a broach comprising in combination, a broach head reciprocable along a predetermined path and engageable with the broach for moving the broach through a working stroke in one direction and adapted to release the broach at the conclusion of such stroke; return mechanism disposed to engage and move said broach in an opposite direction through a return stroke to said starting position, said return mechanism including means to effect said return movement in a path displaced from the path of said working stroke; and a reciprocating member common to both said broach head and said return mechanism for effecting said movement of the broach head and for effecting movement of the return mechanism.

12. In a broaching machine, the combination of a head reciprocable along a predetermined path from a starting position through a working and a return stroke and engageable with a broach to move the broach during the working stroke of the head, said head being adapted to release the broach at the conclusion of the working stroke; return mechanism for engaging the broach at the conclusion of the working stroke and moving the broach through a return stroke to said starting position; and means for actuating the return mechanism to cause it to engage the broach at the conclusion of the working stroke, displace it to a path spaced from the path of the broach working stroke, and return the broach along said displaced path.

RICHARD A. THOMPSON.